(12) United States Patent
Weng

(10) Patent No.: US 6,700,334 B2
(45) Date of Patent: Mar. 2, 2004

(54) RF WIRELESS REMOTE-CONTROL BRIGHTNESS-ADJUSTABLE ENERGY-SAVING LAMP

(75) Inventor: Linsong Weng, Chu-Pei (TW)

(73) Assignee: Hugewin Electronics Co., Ltd., Chu-Pei (TW)

( * ) Notice: Subject to any disclaimer, the term of this patent is extended or adjusted under 35 U.S.C. 154(b) by 37 days.

(21) Appl. No.: 10/191,574

(22) Filed: Jul. 10, 2002

(65) Prior Publication Data

US 2004/0007993 A1 Jan. 15, 2004

(51) Int. Cl.⁷ .............................................. H05B 37/00
(52) U.S. Cl. .................... 315/294; 315/295; 340/825.72
(58) Field of Search ........................ 340/825.71, 825.72; 315/295, 294

(56) References Cited

U.S. PATENT DOCUMENTS 4,780,621 A * 10/1988 Bartleucci et al. ............ 307/11
5,661,468 A * 8/1997 Marcoux ..................... 340/7.1

* cited by examiner

*Primary Examiner*—David Vu
(74) *Attorney, Agent, or Firm*—Rosenberg, Klein & Lee

(57) ABSTRACT

An RF wireless remote-control brightness-adjustable energy-saving lamp is provided which includes a brightness-adjustable energy-saving lamp and a RF remote-control module. The brightness-adjustable energy-saving lamp has a RF wireless receiver circuit therein to receive a remote-control signal and transmit it to a CPU. The CPU is used to discriminate the remote-control signal, convert it into a PWM signal, and output the PWM signal to a pulse-to-DC-voltage-level output circuit. The RF remote-control module can learn the internal code of the brightness-adjustable energy-saving lamp and transmit out a remote-control signal to the brightness-adjustable energy-saving lamp through pressing a key.

12 Claims, 3 Drawing Sheets

RF WIRELESS REMOTE-CONTROL BRIGHTNESS-ADJUSTABLE ENERGY-SAVING LAMP

FIELD OF THE INVENTION

The present invention relates to an energy-saving lamp and, more particularly, to an energy-saving lamp, which can be remotely controlled in wireless way to generate multi-stage brightness.

BACKGROUND OF THE INVENTION

Along with enhancement of living standard, there are continual innovations in home environment designs. In order to match aesthetic of the whole space, the design of illumination has already been much appreciated. Because energy-saving lamps have the advantages of long lifetime of use, energy saving, low fault rate, stable light, high luminescence efficiency, and high compatibility with various kinds of lamps as compared to conventional tungsten light lamps, they have become the mainstream in the market.

A common energy-saving lamp mainly comprises a small fluorescent tube and a stabilizer. An AC current of a certain frequency is, generated through an oscillation circuit in the stabilizer to light the fluorescent tube. This kind of design lets the energy-saving lamp has only two types of operation: "ON" and "OFF". This is different from a conventional tungsten lamp, which can have different luminescence levels along with change of supplied electricity. The brightness of the conventional energy-saving lamp thus cannot be adjusted to fully meet the requirement of mood building for people appreciating life quality. Therefore, for most stores and residences appreciating mood, the energy-saving lamps have less practicality and convenience.

Accordingly, the present invention aims to propose an energy-saving lamp whose brightness can be adjusted. In order to let people conveniently control the operation of a brightness-adjustable energy-saving lamp and help the handicapped control the energy-saving lamp by themselves without the help of others, the present invention proposes a radio-frequency (RF) wireless remote-control brightness-adjustable energy-saving lamp.

SUMMARY OF THE INVENTION

The primary object of the present invention is to propose a RF wireless remote-control brightness-adjustable energy-saving lamp, which exploits mutual learning of internal codes of a remote-control module and light-adjustable energy-saving lamps to let the remote-control module be capable of remotely controlling a plurality of sets of light-adjustable energy-saving lamps. Moreover, a user can press the same key of the remote-control module for many times to achieve multistage change of brightness of the light-adjustable energy-saving lamp.

Another object of the present invention is to propose a RF wireless remote-control brightness-adjustable energy-saving lamp, which can control a brightness-adjustable energy-saving lamp via telephone DTMF (Dual Tone Multi-Frequency) tone.

Another object of the present invention is to propose a RF wireless remote-control brightness-adjustable energy-saving lamp, which can control a brightness-adjustable energy-saving lamp via a computer or the Internet.

According to the present invention, a RF wireless remote-control brightness-adjustable energy-saving lamp comprises a brightness-adjustable energy-saving lamp and a remote-control module. The brightness-adjustable energy-saving lamp has a RF wireless receiver circuit therein for receiving a remote-control signal from the remote-control module and transmitting it to a central processing unit (CPU). The CPU discriminates the remote-control signal, converts it into a pulse width modulation (PWM) signal, and then outputs the PWM signal to a pulse-to-DC-voltage-level output circuit, which converts the PWM signal into a DC voltage level. A starting and brightness adjusting circuit connected to a lamp tube and a starter power source circuit is connected to the pulse-to-DC-voltage-level output circuit so that the luminescent brightness of the lamp tube can be adjusted according to the DC voltage level. The remote-control module can send out different remote-control signals to the brightness-adjustable energy-saving lamp to remotely control the brightness thereof in multistage way.

The various objects and advantages of the present invention will be more readily understood from the following detailed description when read in conjunction with the appended drawing, in which:

DETAILED DESCRIPTION OF THE PREFERRED EMBODIMENTS

Figure 1:
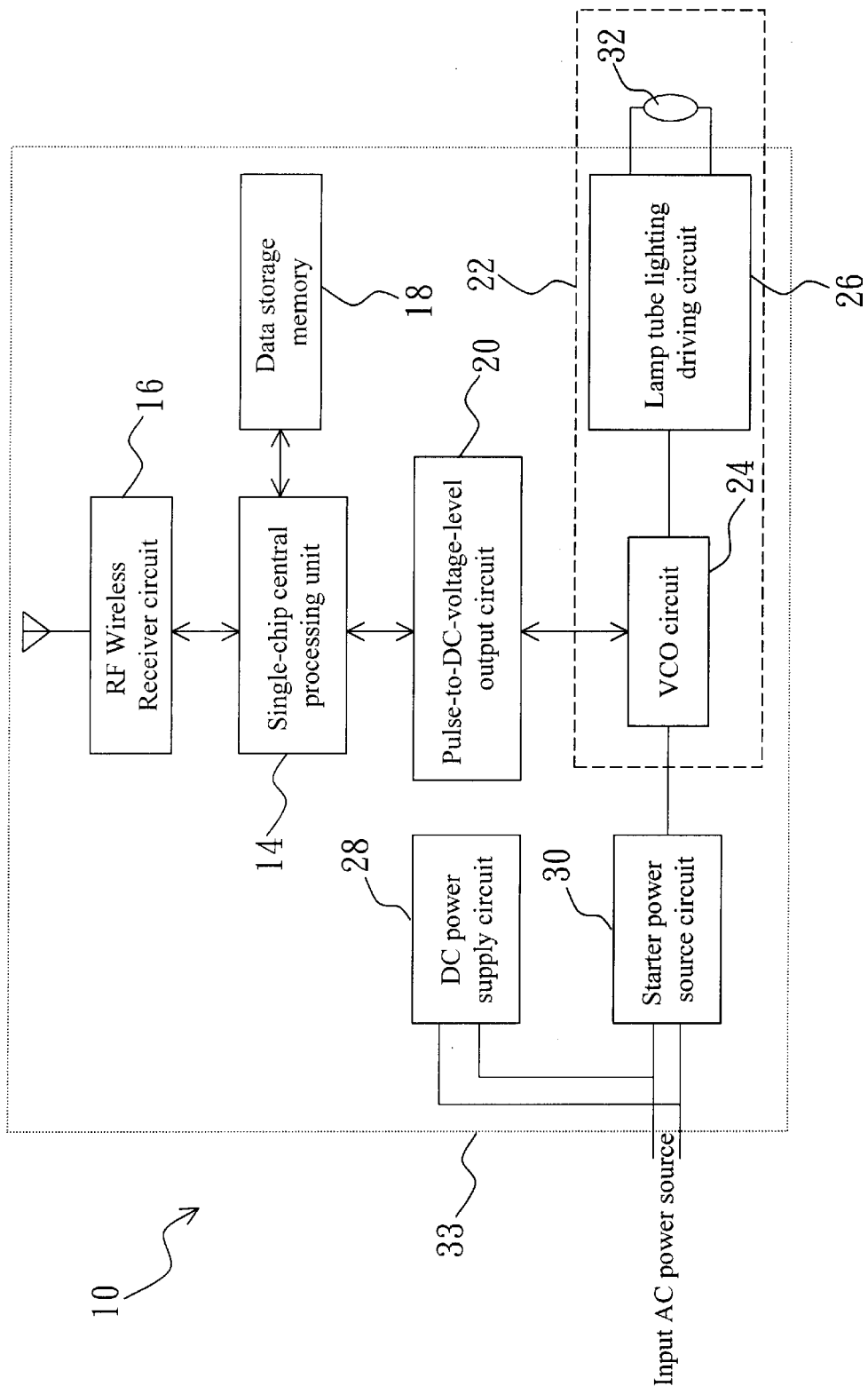
FIG. 1 is a structure block diagram of a brightness-adjustable energy saving lamp of the present invention.
Figure 2:
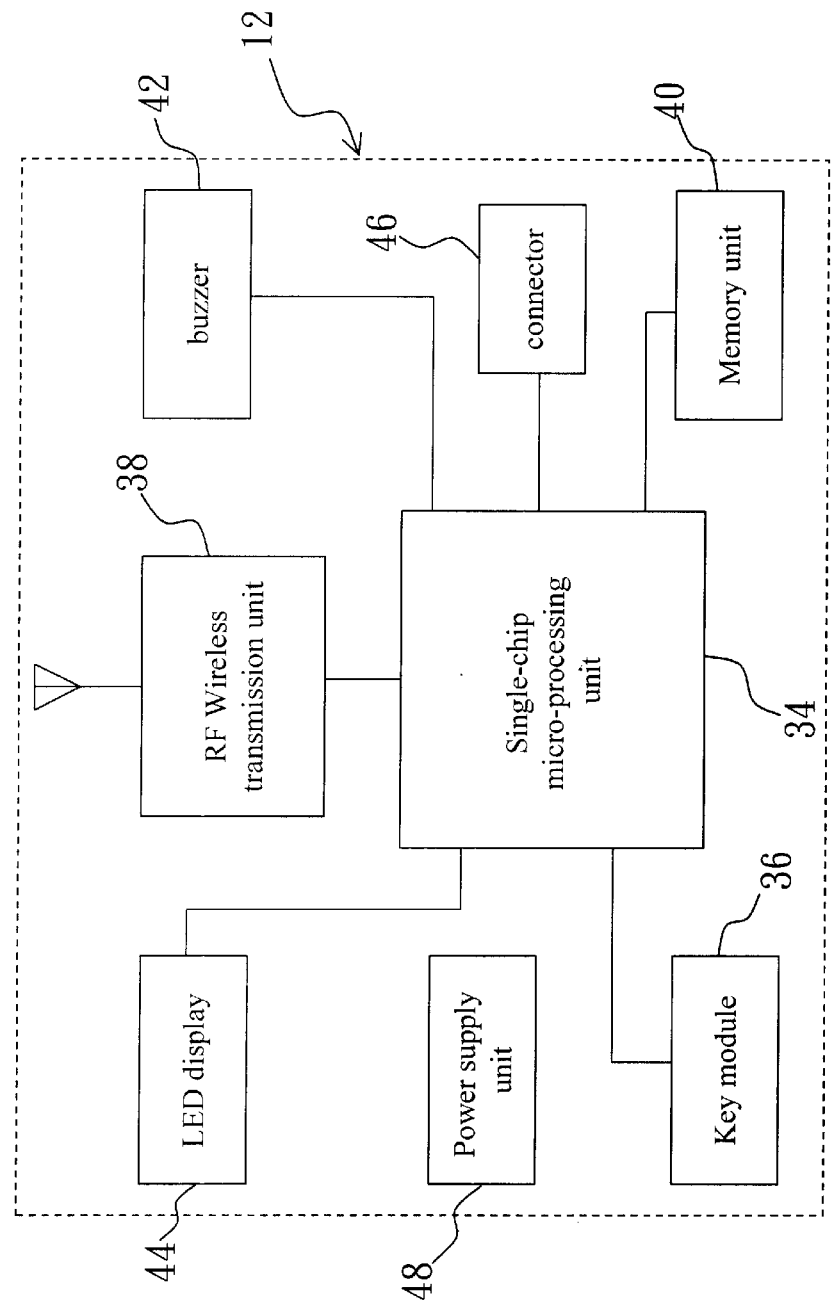
FIG. 2 is a structure block diagram of a handheld RF remote-control module of the present invention.

As shown in FIGS. 1 and 2, the present invention comprises a brightness-adjustable energy-saving lamp 10 and a handheld RF remote-control module 12. The brightness-adjustable energy-saving lamp 10 has a single-chip CPU 14 therein for controlling the operation thereof. The single-chip CPU 14 is connected to a RF wireless receiver circuit 16, a data storage memory 18, and a pulse-to-DC-voltage-level output circuit 20. The pulse-to-DC-voltage-level output circuit 20 is also connected to a staring and brightness adjusting circuit 22, which is formed by connecting a voltage controlled oscillator (VCO) circuit 24 and a lamp tube lighting driving circuit 26. The VCO circuit 24 is connected to a starter power source circuit 30, which is connected to an external AC power source and a DC power supply circuit 28. The output terminal of the lamp tube lighting driving circuit 26 is connected to an energy-saving lamp tube 32. The RF wireless receiver circuit 16 is used to receive a remote-control signal from the handheld RF remote-control module 12 and transmit it to the single-chip CPU 14, which confirms the remote-control signal according to an internal code of the handheld RF remote-control module stored in the data storage memory 18, and simultaneously discriminates which instruction the remote-control signal from the handheld RF remote-control module is. After confirmation, the single-chip CPU 14 converts the discriminated instruction into a PWM signal with a pulse width of a certain continuous length, and outputs to the pulse-to-DC-voltage-level output circuit 20, which converts the PWM signal into a DC voltage level. The VCO circuit 24 then generates an oscillation frequency according to the DC voltage level to drive the lamp tube lighting driving circuit 26, thereby adjusting the luminescent brightness of the energy-saving lamp tube 32. All the single-chip CPU 14, the RF wireless receiver circuit 16, the data storage memory 18, the pulse-to-DC-voltagelevel output circuit 20, the starting and brightness adjusting circuit 22, the starter power source circuit 30, and the DC power supply circuit 28 are installed on a circuit board 33 in the brightness-adjustable energy saving lamp 10.

The handheld RF remote-control module 12 comprises a single-chip micro-processing unit 34 connected to a key module 36, a RF wireless transmission unit 38, and a memory unit 40. The single-chip micro-processing unit 34 is used to control the operation of the handheld RF remote-control module 12, and has a remote-control learning program and a remote-control program built therein. When a key module 36 is pressed by a user, the internal code of the brightness-adjustable energy-saving lamp 10 is set through the work program, and the brightness-adjustable energy-saving lamp 10 learns the internal code of the handheld RF remote-control module 12. The handheld remote-control module 12 can thus simultaneously control several brightness-adjustable energy-saving lamps 10 which have learnt the internal code so that the brightness-adjustable energy-saving lamps 10 can change the luminescent brightness according to the remote-control signal after they receive the remote-control signal. A buzzer 42 and an LCD display 44 are connected to the single-chip micro-processing unit 34. During remote control, the buzzer 42 will give out sound to ensure input, and the LCD display 44 will give out light to display various kinds of states. The single-chip micro-processing unit 34 is further connected to a connector 46, usually being an RS-232 connector, so that the handheld RF remote-control module 12 can be connected to a computer. The computer can issue instructions to the brightness-adjustable energy-saving lamp 10. The handheld RF remote-control module 12 can further be connected to the Internet via the computer so that the brightness-adjustable energy-saving lamp 10 can be remotely controlled through network. A power supply unit 48, usually being a battery set, is used to provide the required electricity for all the above components.

When the handheld RF remote-control module 12 is used for brightness adjustment, it continually outputs different digital remote-control signals to the brightness-adjustable energy-saving lamp 10 according to the set pressed times of numeric keys to let the single-chip CPU 14 output PWM signals having different pulse frequencies, which are converted into different voltage levels to let the VCO circuit 24 generate different oscillation frequencies according to the voltage levels, thereby adjusting the brightness of the brightness-adjustable energy-saving lamp 10 in multistage way. If the brightness-adjustable energy-saving lamp 10 has four stages of brightness adjustment, it will change from the highest luminescent brightness to other three diminishing luminescent brightness along with continual pressing of a one-touch key of the handheld remote-control module 12. When the brightness-adjustable energy-saving lamp 10 is to be turned off, it is only necessary to press an "OFF" key on the key module 36 of the handheld RF remote-control module 12 once.

In addition to providing remote-control function of the brightness-adjustable energy-saving lamp 10, the present invention also dispenses with inconvenience caused by the need that he goes to the brightness-adjustable energy-saving lamp 10 for operation himself. Moreover, the brightness adjustment circuit in the brightness-adjustable energy-saving lamp 10 can change the luminescent brightness according to the remote-control instruction so that the brightness-adjustable energy-saving lamp 10 has the advantage of multistage luminescent brightness.

Figure 3:
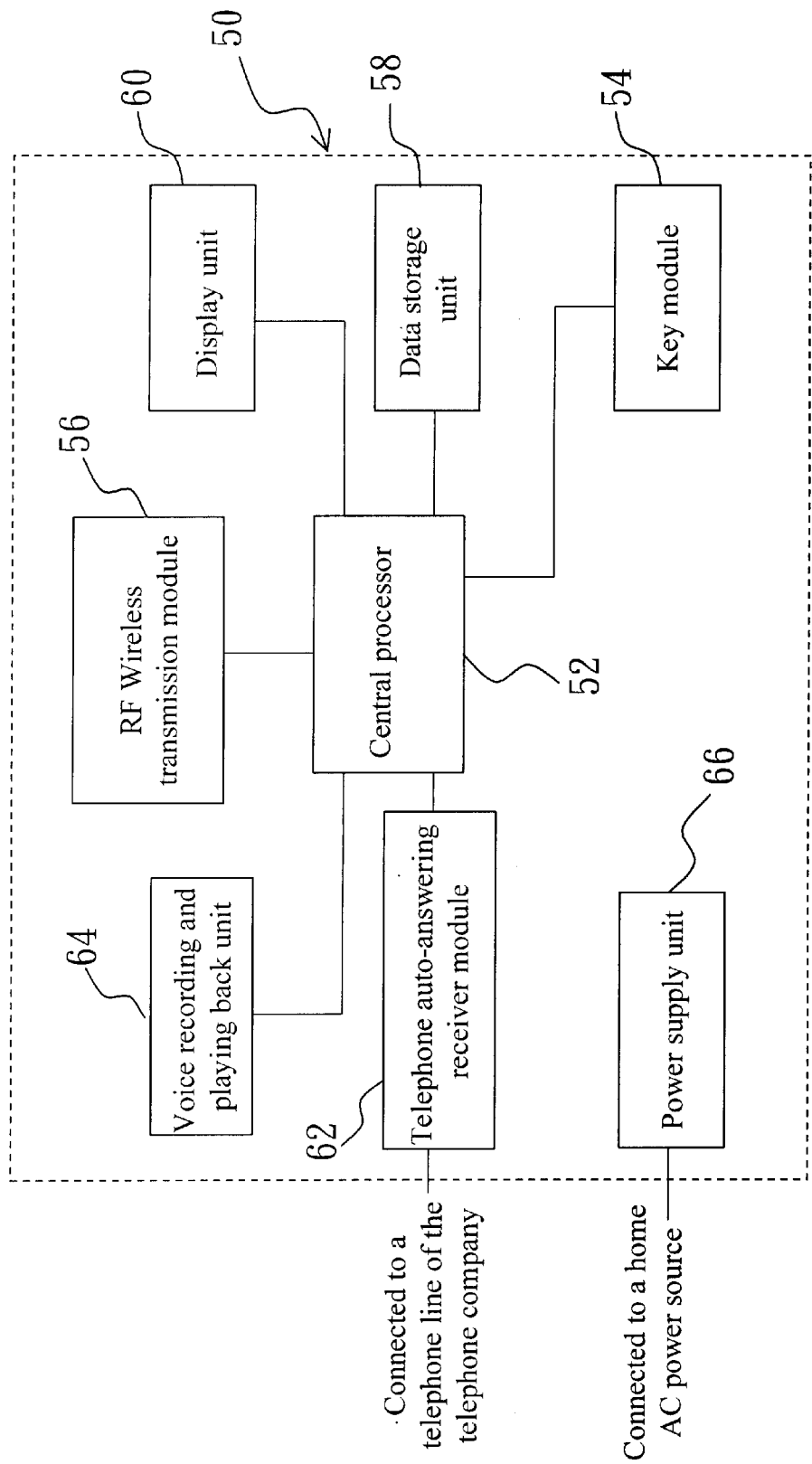
FIG. 3 is a structure block diagram of a far-end telephone remote-control module of the present invention.

On the other hand, in addition to being remotely controlled by the handheld RF remote-control module 12 in RF wireless way, the brightness-adjustable energy-saving lamp 10 can also be controlled by a far-end telephone remote-control module 50. As shown in FIG. 3, the far-end telephone remote-control module 50 comprises a central processor 52 connected to a key module 54, a RF wireless transmission module 56, a data storage unit 58, a display unit 60, a telephone auto-answering receiver module 62, and a voice recording and playing back unit 64. The central processor 52 receives the keyed-in internal code and instruction of the key module 54, lets the display unit 60 simultaneously display the internal code, and stores it into the data storage unit 58. The telephone auto-answering receiver module 62 is connected to a public telephone switch network. When a user enters the far-end telephone remote-control module 50 via a telephone line, the voice recording and playing back unit 64 will provide operation indications for him to achieve simple operation. Meanwhile, the telephone automatic-answer receiver module 62 will transmit the received telephone multi-frequency signals (DTMF) to the central processor 52, which will send out a control signal to be transmitted out by the RF wireless transmission module 56, hence setting and controlling the brightness-adjustable energy-saving lamp 10. A power supply unit 66 is also provided to supply electricity for the whole far-end telephone remote-control module 50. The power supply unit 66 is connected to a home AC power source. A telephone multi-frequency signal discriminator (not shown) can further be disposed between the telephone automatic-answer receiver module 62 and the central processor 52 to provide discrimination of code for the user, thereby securing safety of use of the brightness adjustment unit.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. An RF wireless remote-control brightness-adjustable energy-saving lamp, comprising:

a brightness-adjustable energy-saving lamp having a CPU therein, said CPU being connected to an RF wireless receiver circuit, a data storage memory, and a pulse-to-DC-voltage-level output circuit, said RF wireless receiver circuit being used to receive a remote-control signal and transmit it to said CPU, said CPU being used to discriminate said remote-control signal, convert it into a pulse width modulation signal, and output said pulse width modulation signal to said pulse-to-DC-voltage-level output circuit, said pulse-to-DC-voltage-level output circuit being used to convert said pulse width modulation signal into a DC voltage level and output said DC voltage level to a starting and brightness adjusting circuit, said starting and brightness adjusting circuit being series-connected with a lamp tube and a starter power source circuit, said starting and brightness adjusting circuit being used to adjust the luminescent brightness of said lamp tube according to said DC voltage level, a power supply circuit connected to said starter power source circuit being also provided; and a remote-control module for transmitting out said remote-control signal to said brightness-adjustable energy-saving lamp.

2. The RF wireless remote-control brightness-adjustable energy-saving lamp as claimed in claim 1, wherein said starting and brightness adjusting circuit is formed by connecting a voltage controlled oscillator circuit and a lamp tube lighting driving circuit.

3. The RF wireless remote-control brightness-adjustable energy-saving lamp as claimed in claim 1, wherein said power supply circuit of said brightness-adjustable energy-saving lamp is a DC power supply circuit.

4. The RF wireless remote-control brightness-adjustable energy-saving lamp as claimed in claim 1, wherein all of said CPU, said RF wireless receiver circuit, said data storage memory, said pulse-to-DC-voltage-level output circuit, said starting and brightness adjusting circuit, said starter power source circuit, and said power supply circuit are installed on a circuit board of said brightness-adjustable energy-saving lamp.

5. The wireless RF remote-control brightness-adjustable energy-saving lamp as claimed in claim 1, wherein said remote-control module is either a handheld remote-control module or a far-end telephone remote-control module.

6. The RF wireless remote-control brightness-adjustable energy-saving lamp as claimed in claim 5, wherein said handheld remote-control module comprises a micro-processing unit connected to a key module, a RF wireless radio-frequency transmission unit, and a memory unit, said RF wireless transmission unit is used to emit out said remote-control signal to said brightness-adjustable energy-saving lamp through pressing a one-touch key of said key module, and a power supply unit is also provided to supply the required electricity for all said components of said handheld RF remote-control module.

7. The RF wireless remote-control brightness-adjustable energy-saving lamp as claimed in claim 6, wherein said micro-processing unit is further connected to a buzzer.

8. The RF wireless remote-control brightness-adjustable energy-saving lamp as claimed in claim 6, wherein said micro-processing unit is further connected to an LCD display.

9. The RF wireless remote-control brightness-adjustable energy-saving lamp as claimed in claim 6, wherein said micro-processing unit is further connected to a connector.

10. The RF wireless remote-control brightness-adjustable energy-saving lamp as claimed in claim 5, wherein said far-end telephone remote-control module comprises a central processor connected to a key module, a RF wireless transmission module, a data storage unit, and a telephone auto-answering receiver module, said central processor receives a keyed-in instruction of said key module and stores it into said data storage unit, said central processor is used to discriminate an inputted instruction of said telephone auto-answering receiver module, and convert it into said remote-control signal to be transmitted out by said RF wireless transmission module to said brightness-adjustable energy-saving lamp, a power supply unit is also provided to supply the required electricity for all said components of said far-end telephone remote-control module.

11. The RF wireless remote-control brightness-adjustable energy-saving lamp as claimed in claim 10, wherein said central processor is further connected to a display unit.

12. The RF wireless remote-control brightness-adjustable energy-saving lamp as claimed in claim 10, wherein said central processor is further connected to a voice recording and playing back unit.

* * * * *